US012366743B2

(12) United States Patent
Malvache et al.

(10) Patent No.: US 12,366,743 B2
(45) Date of Patent: Jul. 22, 2025

(54) METHOD FOR PRODUCING A DIGITAL IMAGE, ASSOCIATED COMPUTER PROGRAM PRODUCT AND OPTICAL SYSTEM

(71) Applicant: UNISTELLAR, Marseilles (FR)

(72) Inventors: Arnaud Malvache, Fuveau (FR); Antonin Borot, Marseilles (FR); Benjamin Lefaudeux, Menlo Park, CA (US); Laurent Marfisi, Marseilles (FR)

(73) Assignee: UNISTELLAR, Marseilles (FR)

( * ) Notice: Subject to any disclaimer, the term of this patent is extended or adjusted under 35 U.S.C. 154(b) by 966 days.

(21) Appl. No.: 17/467,731

(22) Filed: Sep. 7, 2021

(65) Prior Publication Data

US 2021/0405341 A1    Dec. 30, 2021

Related U.S. Application Data

(63) Continuation of application No. 16/322,226, filed as application No. PCT/FR2017/052203 on Aug. 4, 2017, now Pat. No. 11,181,729.

(30) Foreign Application Priority Data

Aug. 5, 2016   (FR) ..................... 1657596

(51) Int. Cl.
*G02B 23/00* (2006.01)
*G01C 21/02* (2006.01)
(Continued)

(52) U.S. Cl.
CPC ............. *G02B 23/10* (2013.01); *G01C 21/02* (2013.01); *G02B 27/0093* (2013.01);
(Continued)

(58) Field of Classification Search
CPC .. G02B 23/10; G02B 27/0093; G02B 27/026; G02B 2027/0138; G02B 2027/014;
(Continued)

(56) References Cited

U.S. PATENT DOCUMENTS

2001/0000677 A1   5/2001   Takagi et al.
2016/0109695 A1   4/2016   Hillis et al.
(Continued)

FOREIGN PATENT DOCUMENTS

DE   102005025048 A1   12/2006
EP   2472472 A1   7/2012
(Continued)

OTHER PUBLICATIONS

Lintu et al., "An Augmented Reality System for Astronomical Observations", Virtual Reality, 2006. IEEE Alexandria, VA, USA Mar. 25-29, 2006, Piscataway, NJ, USA, IEEE, Mar. 25, 2006, p. 6-16; 10 pages.

(Continued)

*Primary Examiner* — Henry Duong
(74) *Attorney, Agent, or Firm* — Maier & Maier, PLLC

(57) ABSTRACT

The invention relates to an optical system for restoring a natural image combined with a digital image, in order to characterise and highlight the objects represented on the natural image. The optical system includes an objective lens, an eyepiece, a semi-reflective plate, a processing unit, capturing means and restoring means. The invention also relates to a method for producing such a digital image.

16 Claims, 3 Drawing Sheets

(51) Int. Cl.
  *G02B 23/10* (2006.01)
  *G02B 27/00* (2006.01)
  *G02B 27/02* (2006.01)
  *G09B 27/00* (2006.01)
  *G09B 27/04* (2006.01)
  *G02B 27/01* (2006.01)

(52) U.S. Cl.
  CPC ........... *G02B 27/026* (2013.01); *G09B 27/00* (2013.01); *G09B 27/04* (2013.01); *G02B 2027/0138* (2013.01); *G02B 2027/014* (2013.01); *G02B 2027/0141* (2013.01)

(58) Field of Classification Search
  CPC ............ G02B 2027/0141; G02B 23/00; G01C 21/02; G09B 27/00; G09B 27/04; G01B 9/06
  USPC .......................................... 359/399
  See application file for complete search history.

(56) References Cited

U.S. PATENT DOCUMENTS

2018/0227503 A1   8/2018   Ando et al.
2019/0109695 A1*  4/2019   Kim ..................... H04L 5/0048

FOREIGN PATENT DOCUMENTS

| JP | H05-72486 A | 3/1993 |
| JP | 2009-258212 A | 11/2009 |
| JP | 2009-288269 A | 12/2009 |

OTHER PUBLICATIONS

Filippenko et al., "Abstract", International Astronomical Union Colloquium, vol. 183, Jan. 1, 2001, p. 121-130; 10 pages.
International Search Report issued on Dec. 11, 2017 in corresponding International application No. PCT/FR2017/052203; 7 pages.

* cited by examiner

METHOD FOR PRODUCING A DIGITAL IMAGE, ASSOCIATED COMPUTER PROGRAM PRODUCT AND OPTICAL SYSTEM

CROSS-REFERENCE TO RELATED APPLICATIONS

The present patent application claims benefit and priority to U.S. patent application Ser. No. 16/322,226 filed on Jan. 31, 2019 and the National Phase application of International Application No. PCT/FR2017/052203 filed on Aug. 4, 2017, which claims priority to French Application No. 1657596 filed on Aug. 5, 2016, the contents of which are all incorporated herein by reference.

FIELD

The invention relates to an optical system making it possible to restore a natural image of a study scene combined with a digital image, in order to characterize and highlight objects present on said natural image. Such an optical system can, as non-limiting examples, consist of an astronomical telescope, a telescope or binoculars.

More specifically, the invention relates to a method for producing a digital image. Said digital image can, as a non-limiting example, be produced from the natural image of the study scene and comprise, as a non-limiting example, a text zone associated with an item of metainformation characterizing an object represented on the digital image, such as for example a name of said object, the size thereof, the position thereof relative to other objects, etc.

As a preferred, but non-limiting example of application, the invention will be described through an astronomical telescope of which an objective lens captures a study scene corresponding to a portion of the ceiling structure, i.e. a portion comprising astronomical objects, such as, as non-limiting examples, stars, planets, galaxies and/or nebula.

Below in the document, it will be understood by "optical system", any system making it possible to capture light beams emitted by an object then to form and restore a natural image using a set of optical elements, such as mirrors, lenses, etc. "Natural image", also qualified as "real image", will be named as any image not having undergone an electronic transformation and "digital image", the digital representation of a natural image, i.e. an image having undergone an electronic transformation. By "object" or "astronomical object", this means any object which can be observed by an optical system, such as, as non-limiting examples, a heavenly body, a star, a planet, an airplane, a satellite, an animal, a star constellation, etc.

BACKGROUND

People have observed the sky throughout history. With the naked eye, they have observed stars and planets. They have thus been able to determine the relative positions thereof, thus defining constellations, i.e. groups of stars having a figure or a constant pattern, such as for example, the "Big Dipper" composed of seven stars. According to the invention of the astronomical telescope and the telescope, people have been able to observe more astronomical objects, some even being located outside of the solar system, like for example nebula or galaxies. These astronomical objects not being visible to the naked eye, it is difficult for an inexperienced astronomer to correctly orient their optical system towards the ceiling structure in order to observe them. Indeed, several criteria must be combined. First, the optical system must be efficient, i.e. have a suitable opening and magnification. Then, the observation conditions must be optimal, i.e. that a sky is needed not having any or hardly any light pollution, in order to be able to mainly capture light from astronomical objects. Finally, the user must be patient and have necessary information regarding the localization of the astronomical objects to be observed. A novice astronomer, not coming to orient their optical system correctly, can now become quickly disappointed and abandon observation from the ceiling structure.

To facilitate searching for astronomical objects, some optical systems have been motorized. It is, for example, the case of some telescopes. Such a telescope generally comprises an embedded electronic system, making it possible for a user to inform about the astronomical object sought. The telescope thus automatically points towards the latter using a motor correctly orienting said telescope. Thus, the user can directly observe the desired astronomical object. However, such optical systems require a laborious polar alignment procedure and/or the addition of a camera with a very large field parallel to the main telescope in order to achieve such an alignment automatically. Furthermore, some astronomers remain attached to the "searching for an astronomical object" aspect, and thus do not wish to remain passive in their observation quest. In addition, such a telescope, although possibly motorized, can restore a natural image of the astronomical object observed, which can be disappointing for an astronomer. For example, such a system can restore a grey mass representing a nebulous. Indeed, with some astronomical objects being located several light years away from Earth, the quantity of light captured by the optical system can be limited. The natural image restored by said system can now not meet the expectations of the user, the latter comparing the result of their observation with images of astronomical objects observed by super telescopes, such as the Hubble telescope, for example. In addition, the low quality of the natural image restored by the optical system can induce a user error during their observation. Indeed, the image observed, apart from the low resolution thereof and/or the low contrast thereof and the low luminosity thereof, can prevent a user from identifying an astronomical object observed. Finally, the user can make errors regarding the orientation of their optical system and point towards an astronomical object different from that initially sought, thus leading to interpretation errors.

To improve the quality of the image restored by optical systems, some telescopes are equipped with an increased reality system, such as for example, the system described in document DE 10 2005 025 048. Such a system captures a part of the light from a scene observed to create a digital image of said scene observed, for example, by means of a first semi-reflective plate and a matrix sensor. The digital image thus created is compared with a database containing high-resolution images of astronomical objects commonly observed. Using a method for recognizing and comparing images, the pointed zone can now be identified. A high-resolution image corresponding to the scene observed can be restored in the optical system, the observation thereof being made through an eyepiece. According to some variants, this image can be completed with additional information characterizing a specific astronomical object. Using a second semi-reflective plate, the high-resolution image and the natural image are combined and restored simultaneously to the user by the optical system. This system however has the major disadvantage of considerably reducing the luminosity of the natural image restored to the user by using two semi-reflective plates, thus altering the natural perception of the astronomical object observed. In addition, the user of such a system perceives the high-resolution image more than the natural image, thus altering the observation thereof and the assessment thereof. Furthermore, such systems have an increased processing time, because in particular of the implementation of a series of comparisons of the scene observed with numerous images stored within the database. During this particularly time-consuming processing, an astronomical object observed can thus exit the field of vision of the optical system, the natural image and the high-resolution image selected offering no more correspondence. Indeed, because of the rotation of the Earth, the optical system is constantly moving with respect to the ceiling structure, said correspondence thus only being able to be perfectly corrected by very expensive and very specific motorized frames. Using two separating plates is not only expensive, in the acquisition and during the maintenance of the system, but also adds weight constraints in the frame of such a telescope could, even create an imbalance of it during the use thereof.

The invention makes it possible to respond to all or part of the disadvantages raised by known solutions.

SUMMARY

Among the numerous advantages brought by the invention, it can be mentioned that a system according to the invention makes it possible to preserve a large part of the light captured by the optical system and thus restore a natural image having an excellent luminosity, through in particular the preferred use of one single semi-reflective plate. The invention also makes it possible to identify the astronomical object observed more quickly. The user is thus ergonomically informed for the whole observation time. It can be mentioned that the invention also makes it possible to provide a comfort in observation to the user, this being simply guided and informed regarding the astronomical object observed quickly and intuitively. The restoration of a study scene to a user is not perceived artificially, as it is produced from the natural image captured, said restoration making it possible, what is more, to observe transitory or new phenomena and objects. Collaboratively, an optical system according to the invention proposes a method for enriching a localization database, making it possible ultimately to deliver metainformation in line with a studied scene, when a new astronomical object has been identified. Such a method according to the invention makes it possible for a user, possibly a novice, to collect reliable images, specifically identified and associated with metainformation, said images corresponding to study scenes of scientific interest.

The invention finally provides assistance to the aiming of a desired scene, while leaving to the user, the possibility to implement the search thereof for astronomical objects while being supported, guided and advised if they so wish.

To this end, an optical system comprising a processing unit is in particular provided to produce a digital image and a hollow body, comprising:
  an objective lens to collect a set of incoming light beams from a study scene;
  an eyepiece to restore all or some of the incoming light beams;
  capture means having an active face, to capture all or some of the incoming light beams;
  restoration means comprising an active face to project, into the hollow body, the digital image in the form of a set of projected light beams.

Also, the processing unit is arranged to produce the digital image from light beams captured and an item of metainformation recorded in a memory of said processing unit. To optimize the identification of a pattern, characteristic within a study scene, by knowing the portion of the ceiling structure observed, an optical system according to the invention comprises means for determining positioning data of a study scene in the ceiling structure observed through the eyepiece cooperating with the processing unit, said means consisting of land localization means of the optical system and means for determining the orientation of the objective lens of said optical system.

According to a preferred, but non-limiting embodiment, to preserve a large part of the light captured by the optical system and thus superpose on the digital image, a natural image having an excellent luminosity, an optical system according to the invention can comprise a semi-reflective plate positioned within the hollow body to reflect a first subset of incoming light beams towards the active face of said capture means and transmit a second subset of incoming light beams towards the eyepiece, said semi-reflective plate furthermore being arranged to transmit and reflect the first and second subsets of said light beams projected respectively towards the active face of the capture means and the eyepiece. Furthermore, the respective active faces of the capture means and the restoration means can face one another and be arranged on either side of the semi-reflective plate, said active faces being passed through by a virtual transversal axis of the hollow body perpendicular to a virtual longitudinal axis of said hollow body and passing through the center of the semi-reflective plate.

To limit the capture of light beams projected by the restoration means and transmitted by the semi-reflective plate, the hollow body of the optical system can comprise a polarizer arranged between the capture means and said restoration means, said polarizer being passed through by the virtual transversal axis.

In a variant or complementarily, the hollow body of the optical system can comprise an imaging lens to constitute an image from projected light beams, arranged between the restoration means (25) and the semi-reflective plate, said lens being passed through by the virtual transversal axis.

Advantageously, in order to offer to a plurality of users, possible geographically distant, the possibility of collaborating, transmitting and exchanging the product of their discoveries and observations, an optical system according to the invention can further comprise communication means cooperating with the processing unit, arranged to receive a transmission message emitted from a third-party entity, the processing unit being arranged to:
  decode a transmission message emitted by said third-party entity, said transmission message encoding characteristic data of a determined pattern, localization data and an item of metainformation associated with said pattern;
  enter in the data memory, said characteristic data of a determined pattern, said localization data and said metainformation associated with said pattern deduced from said transmission message.

In a variant or complementarily, the communication means of an optical system according to the invention can be arranged to emit a discovery message and the processing unit of said optical system can be furthermore arranged to:

produce said discovery message, such that it encodes the images and the positioning data from the study scene in the ceiling structure;

trigger the emission of said discovery message by the communication means to require from a third-party entity, characteristic data of a determined pattern by said positioning data of the study scene and an item of metainformation in line with said determined pattern.

In addition, an optical system according to the invention, can further comprise communication means cooperating with the processing unit, arranged to receive a discovery message, the processing unit being arranged to:

search in the data memory, characteristic data of a pattern determined by said positioning data of the study scene, deduced from said discovery message and characteristic data of a determined pattern, localization data and metainformation associated with said pattern;

produce a transmission message to encode said characteristic data of a determined pattern, said localization data and said metainformation associated with said pattern;

trigger the emission of said transmission message by said communication means.

Also, in a variant or complementarily, an optical system according to the invention, can further comprise communication means cooperating with the processing unit, arranged to receive a discovery message, the processing unit being arranged to:

decode said discovery message, said discovery message comprising positioning data of a study scene in the ceiling structure;

search in the data memory of the characteristic data of a pattern determined by said positioning data of the study scene deduced from said discovery message and characteristic data of a determined pattern, localization data and an item of metainformation associated with said pattern;

produce a transmission message to encode said characteristic data of a determined pattern, said localization data and said metainformation associated with said pattern;

trigger the emission of said transmission message by said communication means.

According to a second object, the invention provides a method for producing a digital image. Said method is implemented by the processing unit of an optical system according to the invention and observing a study scene, said processing unit cooperating with capture means, restoration means and a data memory of said system. To be able to characterize objects present on the digital image, the data memory comprises a recording associated with a determined pattern comprising an item of metainformation characterizing said pattern. To produce a digital image, said method comprises:

a step for triggering the capture of incoming light beams from said study scene by the capture means and producing a digital representation of said study scene;

a step for analyzing said digital representation and detecting the presence of a characteristic pattern;

a step for searching in the data memory for a recording associated with a determined pattern close to said detected characteristic pattern;

a step for extracting the value of the associated metainformation from such a recording;

a step for producing a digital image from the digital representation and from said extracted metainformation;

a step for restoring said digital image by said restoration means.

To be able to determine the localization of the study scene, the processing unit can further cooperate with means to determine the positioning data of the study scene in the ceiling structure and the recording within the data memory associated with the determined pattern can further comprise localization data of said determined pattern in the ceiling structure. The method can now comprise, prior to the step for searching a recording associated with a pattern close to the detected characteristic pattern in the data memory:

a step for collecting localization data produced by said means for determining the localization of the study scene and determining from said localization data and estimating positioning data of the study scene in the ceiling structure;

a step for extracting from a first recording of the data memory, localization data and calculating the distance between said localization data extracted and the positioning data of said study scene in the ceiling structure;

a step for certifying the proximity of a pattern associated with the localization data extracted from the study scene if said calculated distance is less than a predetermined threshold;

said step for searching in the data memory, a recorded associated with a pattern close to the detected characteristic pattern, being implemented if and only if the step for certifying the proximity of the pattern associated with the localization data extracted from the study scene, certifies such a proximity.

To favor the detection of patterns within a digital representation produced, the method can comprise, prior to the step for analyzing said digital representation produced by the capture means, a step for reducing the noise and/or improving the contrast of the digital representation.

To increase the contrast and/or reduce the noise of the digital representation ultimately analyzed, the method can comprise, prior to the step for analyzing said digital representation:

a step for triggering the acquisition of several successive digital representations by the capture means;

a step for producing one single digital representation from said successive digital representations.

To remove any noise or parasite coming from the restoration of a digital image by the restoration means during the capture of incoming beams and reflected by the capture means, the method can comprise:

a step for recording, from the step for restoring the digital image by the restoration means, said digital image in the data memory;

a step prior to the step for analyzing the digital representation, for extracting digital image form the preceding restoration from said data memory, and subtracting said digital image from the digital representation of the current study scene.

To share, in particular, the discovery of a new pattern detected within a digital representation, the processing unit of an optical system according to the invention can furthermore cooperate with the communication means to communicate with a third-party entity. A method for producing a digital image according to the invention can further comprise a step for producing a discovery message sent to the third-party entity comprising the positioning data of the study scene and triggering the emission of said discovery message, if the step for searching in the data memory for a recording associated with a pattern close to the detected characteristic pattern has not succeeded.

According to a third object, the invention relates to a computer program product comprising program instructions which are operable by a processing unit of an optical system according to the first object of the invention, which when they are executed or interpreted by said processing unit, trigger the implementation of a method for producing a digital image according to the invention.

According to a fourth object, the invention relates to an optical system according to the invention, for which the processing unit furthermore cooperate with a program memory comprising instructions of a computer program product according to the third object of the invention.

BRIEF DESCRIPTION OF THE DRAWINGS

Other characteristics and advantages will appear more clearly upon reading the following description relating to an embodiment example given for information purposes and in a non-limiting manner, and upon examining the figures which accompany it, among which.

DETAILED DESCRIPTION

As a preferred, but non-limiting application example, the invention will be described through an application relating to the observation of a study scene S by an optical system 10 according to the invention, said scene S comprising, as a non-limiting example, astronomical objects O1, O2, such a system consisting of a telescope or a particularly intuitive and ergonomic astronomical telescope. Said astronomical objects O1 and O2 are advantageously objects emitting light beams.

Figure 1:
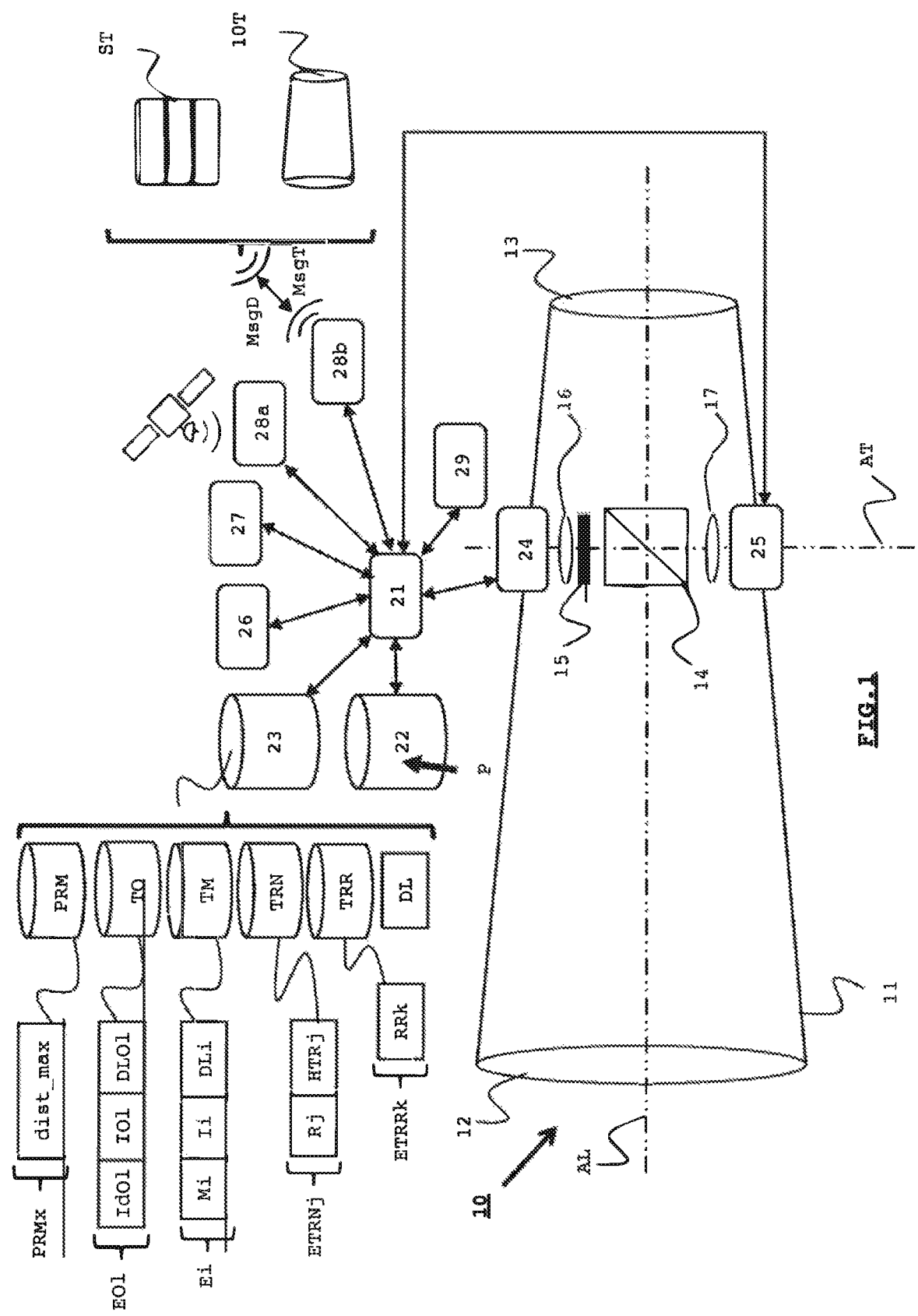
FIG. 1 describes a preferred, but non-limiting embodiment example of an optical system according to the invention.

FIG. 1 makes it possible to present a preferred, but non-limiting example of an optical system 10 according to the invention. Such an optical system 10 comprises a hollow body 11, for example a hollow cylinder, comprising at one of the ends thereof, an objective lens 12 for collecting light beams emitted by astronomical objects O1, O2 observed. As non-limiting examples, such an objective lens 12 can consist of a simple opening, like for example in a telescope. In a variant or complementarily, such an objective lens 12 can comprise a lens, as it used for example in an astronomical telescope or for binoculars. The hollow body 11 of an optical system 10 according to the invention further comprises an eyepiece 13 to restore to a user, the natural image formed by the optical system 10. As non-limiting examples, such an eyepiece 13 can consist of a lens or any other equivalent means.

Figure 2:
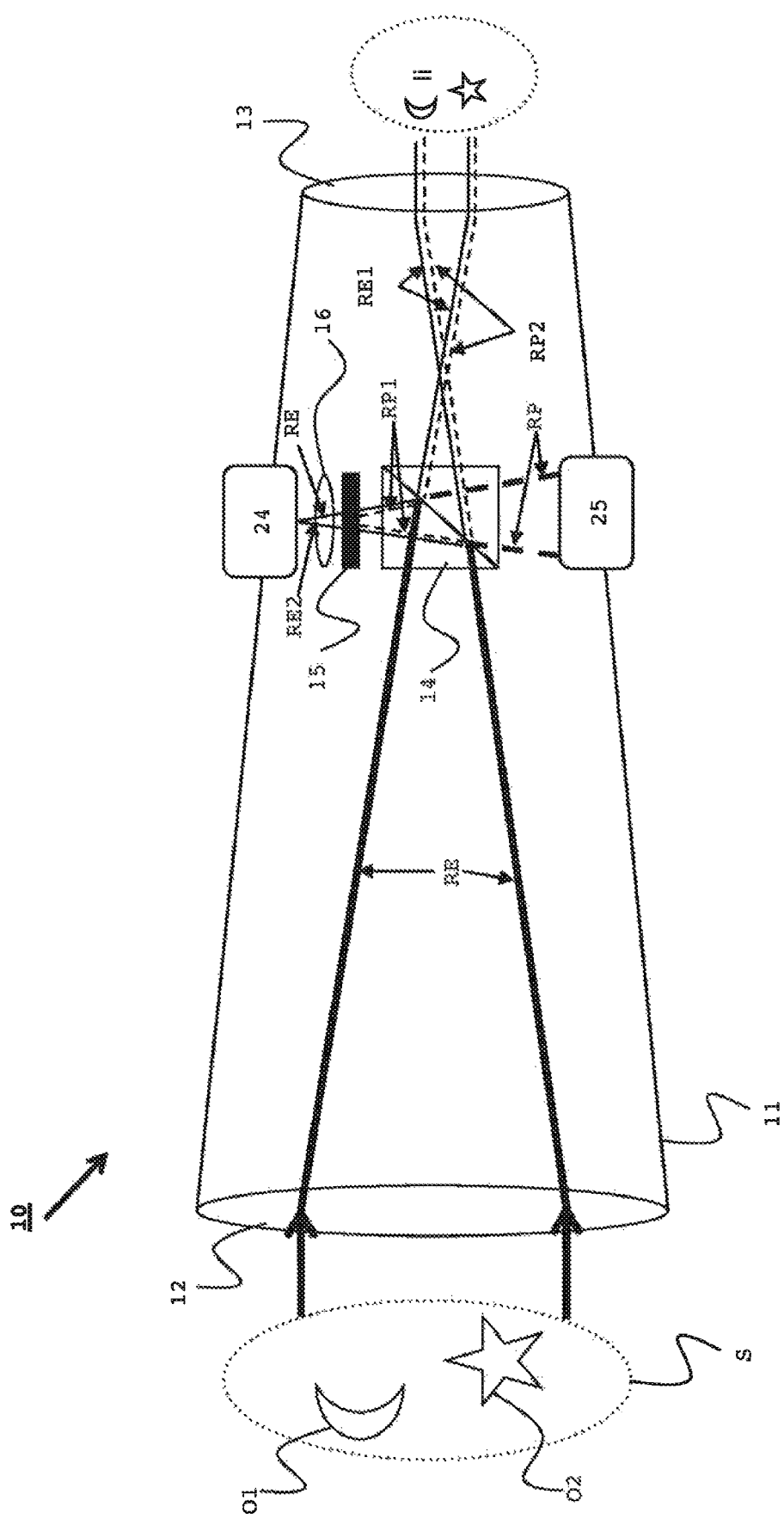
FIG. 2 describes the progression of light beams in an optical system according to the invention during the observation of a study scene.

Such a hollow body 11 further comprises a means 14 for separating a set of light beams RE entering into the system via the objective lens 12 in two subsets RE1 and RE2. Such a means 14 can consist, as non-limiting examples, of a beam separator, a semi-reflective plate, a polarizing cube, a polarizing plate, a semi-reflective mirror or any other optical instrument making it possible to reflect a part of the light beams and transmit the other part. For simplification purposes, below in the document, "semi-reflective plate" will be named as such a means 14. The role of such a semi-reflective plate 14 can now consist of transmitting a first subset of incoming light beams RE1 towards the eyepiece 13 and reflecting a second subset of incoming light beams RE2, such as represented in FIG. 2 by solid lines.

The optical system 10 further comprises capture means 24 arranged in the hollow body 11 and cooperating with a processing unit 21. The latter is responsible for producing a digital image comprising an item of metainformation characterizing or highlighting one or more objects present in a study scene S. Said capture means 24 can, as an example, consist of a matrix sensor and produce a digital representation Rj of a natural image produced by the optical system 10, said natural image being constituted of incoming light beams RE2 and reflected on the semi-reflective plate 14. Said beams are now captured by the capture means 24 by means of the active face thereof. The digital representation Rj delivered by such a sensor can consist of a pixel table, each pixel encoding a shade of gray, a light intensity, or a color. The digital representation Rj is then recorded in the storage means 23, also qualified as data memory 23, cooperating with the processing unit 21. According to an embodiment, the recording of an item of time data t, characterizing the current acquisition or capture period, can be jointly made with that of the digital representation Rj. Such a digital representation Rj can be operated to detect and identify astronomical objects during the observation of the ceiling structure. Such a detection can be made by known detection methods, as will be seen later. Said processing unit 21 can furthermore be operated to produce a digital image characterizing or highlighting objects detected in the study scene S. The capture means 24 can be directly connected by wire bus to said processing unit 21, such buses being represented by double arrows in FIG. 1, or in a variant, separate from said processing unit 21 and cooperating with said processing unit 21 via a wireless connection, such as a non-limiting example, by the implementation of a proximity communication protocol, such as a Bluetooth protocol.

To be able to produce a digital image, the processing unit 21 advantageously comprises one or more microcontrollers or microprocessors cooperating, by coupling and/or by wire bus, with data storage means 23 and/or program means 22, also and respectively qualified from data memories 23 and/or program memories 22. Such storage means 22, 23 can consist, for example, of one or more separate non-volatile memories. The program memory 22 makes it possible to store, in particular, instructions of a program P which, when they are executed or interpreted by said processing unit 21, trigger the implementation of a method determined to produce a digital image. One or more data memories 23 cooperating with said processing unit 21 are structured to record data necessary for the implementation of such a method for producing a digital image according to the invention.

The data memory(ies) 23 are generally electrically erasable and writable. As non-limiting examples, data can be recorded there in tables or chained data structures, each comprising one or more recordings. A first structure TM can comprise one or more recordings Ei, i being a whole number between 1 and n, n being a determined whole number, respectively dedicated or associated with one or more patterns determined by characteristic data Mi in the form, for example, of a polyvector and comprising an item of metainformation Ii characterizing said pattern. By malapropism, a determined pattern Mi will be named instead of said data characterizing it. A second structure TO can comprise one or more recordings EOl, l being a whole number between 1 and r, r being a determined whole number, respectively dedicated or associated with one or more observable astronomical objects O1. A third data structure TRN can comprise one or more recordings ETRNj, j being a whole number between 1 and m, m being a determined whole number, respectively associated with one or more digital representations Rj of a captured natural image. A fourth structure TRR can comprise one or more recordings ETRRk, k being a whole number between 1 and p, p being a determined whole number, respectively associated with one or more digital representations of restorable images RRk. The different structures cited above can, in a variant, only constitute one single logic entity and the respective arrangements thereof could not constitute any limitation of the invention.

Moreover, each recording ETRNj associated with a digital representation Rj can be advantageously arranged to store a pixel table of which each pixel encodes a shade of gray, color or light intensity value. Such a recording can further comprise a value characterizing the time stamping HTRj of the capture period of light beams RE1. Furthermore, each recording ETRRk associated with a digital representation of a restorable image, i.e. restored or ready to be restored, can be arranged to store a pixel table, of which each pixel encodes a shade of grey, color or light intensity value, said restorable image being produced from the captured natural image and from an item of metainformation characterizing a pattern or an object present in the study scene S. Each recording EO1 associated with an astronomical object can also be arranged to store data specific to the latter, such as examples of an object identifier IdO1, localization data DLO1, and one or more items of metainformation IO1 making it possible to characterize such an object. Said localization data DLO1 can consist of declination and right ascension coordinates of the object in question. Such metainformation can, as non-limiting examples, consist of the name of the object, the mass thereof, the distance thereof with respect to the Earth, in one or more identifiers or also pattern names to which it can belong, etc. Finally, each recording Ei associated with a pattern Mi can be arranged to store data to characterize such a pattern Mi, such as examples of localization data DLi of the pattern Mi in the ceiling structure and one or more items of metainformation Ii making it possible to characterize such a pattern. Such a recording Ei can, as non-limiting examples, comprise coordinates of the center of said pattern, coordinates or identifiers of astronomical objects which compose it, and/or vector coordinates extending from the center of said pattern towards said astronomical objects.

Furthermore, the storage means 23 can advantageously comprise a field PRMx, x being a whole number between 1 and y, y being a determined whole number, for example in a data structure of parameters PRM, to record a predetermined value of a distance dist_max characterizing a proximity zone around any astronomical object. This distance can now be used to determine the proximity of a first astronomical object with respect to a second astronomical object.

To restore a digital image RRk produced by the processing unit 21, the hollow body 11 of an optical system 10 according to the invention comprises restoration means 25 cooperating with said processing unit 21 and having an active face, projecting said image. Said restoration means 25 can, for example, consist of an image projector or a screen, for example of OLED (Organic Light-Emitting Display) type, and restore light beams projected RP in the direction of the semi-reflective plate 14, such as represented in FIG. 2 by a dotted line. The latter thus transmits a first subset of beams projected RP1 in the direction of the capture means 24 and reflects a second subset of beams projected RP2 in the direction of the eyepiece 13. The restoration means 25 can thus be directly connected by wire bus to said processing unit 21 or, in a variant, be physically distant from said processing unit 21 and cooperate with it via a wireless connection, for example according to a proximity communication protocol, such as a non-limiting example, the Bluetooth protocol.

To capture and restore respectively a natural image and a digital image, said semi-reflective plate 14, the capture means 24 and the restoration means 25 are advantageously arranged to be disposed on a transversal axis AT of the hollow body 11, said transversal axis AT being perpendicular to a longitudinal axis of said hollow body, such as represented in FIG. 1 by dotted lines AT and AL. The active faces of said restoration means 25 and capture means 24 are now oriented mirrored against one another.

In a variant or complementarily, to create an image from projected light beams RP, the hollow body 11 of an optical system 10 according to the invention can further comprise a lens 17 (not represented in FIG. 2), termed "imaging lens", to orient and/or converge the light beams projected RP by the restoration means 25 towards a determined fixed point, commonly called focus. Said lens is now advantageously positioned between said restoration means 25 and the semi-reflective plate 14 on the transversal axis AT.

In a variant or complementarily also, the hollow body 11 of an optical system 10 according to the invention can comprise a polarizer 15 to absorb said transmitted beams RP1. The role of such a polarizer 15 consists of avoid all or part of the projected light beams RP emitted by the restoration means 25, and more specifically, the light beams projected and transmitted RP1 by the semi-reflective plate 14, being captured by the capture means 24. Such a polarizer 15 is advantageously positioned between the semi-reflective plate 14 and the capture means 24 on the transversal axis AT.

To increase the shooting and therefore the number of captured beams RP2, the hollow body 11 of an optical system 10 according to the invention can comprise a focus-reducing plate 16 positioned between the semi-reflective plate 14 and the capture means 24 on the transversal axis AT.

According to an advantageous, but non-limiting embodiment variant, the invention provides that the optical system 10 can further interact with third-party entities ST, 10T. An optical system 10 according to the invention can now comprise communication means 28b, for example in the form of a modulator/demodulator, cooperating with the processing unit 21, by means of wire buses. By way of said communication means 28b and more specifically of the processing unit 21, the optical system 10 can trigger and/or detect respectively the emission and/or the receiving of messages sent and/or coming from third-party entities 10T, ST positioned in the communication range. If said optical system 10 cooperates with such third-party entities through wireless communication, said elements can furthermore cooperate by any other means capable of conveying said messages. As non-limiting examples, such third-party entities can consist of a remote server ST of a second optical system 10T. According to the invention, such messages can consist, in a non-limiting manner, of discovery messages MsgD comprising the coordinates of a fresh astronomical object, more specifically the positioning data DP of the study scene S and informing said third-party entities of the discovery of said new astronomical object. More generally, such messages can comprise coordinates of a scene to observe in order to assist with characterizing, possibly collaboratively, an object or an astronomical phenomenon. As will be seen later in line with an example of a method for producing a digital image implemented by the processing unit of an optical system 10 according to the invention, such as the method 100 described in line with FIG. 3, the operation of such communication means 28b offers to a plurality of users, possibly geographically distant, the possibility of collaborating, to transmit and exchange the product of the discoveries and/or observations thereof, and this, in order to contribute to an observation or collection of data requested by a third-party entity and/or to enrich in particular the structures TO and/or TM of different optical systems, making it possible thus to all or part of the users, to benefit from the displaying of new metainformation during the observation of a studied scene of the ceiling structure.

Advantageously but non-compulsorily, an optical system 10 according to the invention can further comprise means 26 and/or 27 for determining the localization of the study scene S in the ceiling structure observed by such an optical system 10. Said means can respectively consist of land localization means 26 of the optical system 10 and means 27 for determining the orientation of the objective lens 12 of said optical system 10.

Said land localization means 26 and/or means 27 for determining the orientation of the objective lens 12 of the optical system 10 can in particular cooperate, by way of the processing unit 21, with communication means 28a, such as communication means 28a thus being arranged to communicate with a satellite navigation and localization system, for example GPS, "Global Positioning System". According to this advantageous embodiment, the processing unit 21 is thus responsible for collecting data transmitted by the GPS and received by the communication means 28a and consequently, said processing unit 21 knows exactly the portion of the ceiling structure observed. In a variant, such localization data of the study scene facing the ceiling structure can be informed by a user U. In this case, said optical system 10 can comprise a logging man/machine interface, cooperating with the processing unit 21 by coupling and/or by wire bus, making it possible for the user to enter the geographical coordinates of the placement thereof, for example, in the form of a latitude, a longitude and/or an altitude and/or a time stamp.

Said means 27 for determining the orientation of the objective lens 12 of said optical system 10 can comprise, as non-limiting examples, pair of compasses, a magnetometer, a compass, an accelerometer and/or any other means to determine the orientation of the objective lens 12 cooperating with the processing unit 21, by producing respectively data which, taken individually or together, constitute data making it possible to determine the orientation of the objective lens 12 and of the optical system. The data collected from the localization means 26 and from the means 27 for determining the orientation of the objective lens 12 will be named "localization data DL" below in the document. Such localization data DL can form the subject of a recording within the storage means 23. Combined, said localization data DL make it possible to estimate the positioning data DP of the study scene S, thus making it possible to determine specifically the portion of the ceiling structure, i.e. study scene S observed by said optical system 10. The knowledge of such localization data DL can be operated according to a method for producing a digital image implemented by the processing unit of an optical system 10 according to the invention, such as the method 100 described in line with FIG. 3, in order to reduce the search, within the structure TM, only for the relevant recordings Ei respectively associated with the patterns determined Mi in said portion of the ceiling structure observed. Indeed, the recordings Ei can each comprise the localization data DLi value of a determined relevant pattern Mi facing the study scene S. Thus, although the structure TM can comprise a very large number of recordings Ei, the search for relevant patterns Mi will only cause a minimal operation of recordings Ei within said structure. The recognition of patterns of interest over a reduced field of observation is consequently made possible quickly and intuitively, even almost in real time, for any processing unit 21, even if the latter only has reduced or modest processing capacities.

According to another variant of the invention, an optical system 10 according to the invention can further comprise means 29 for detecting a movement of the hollow body 11, such as a non-limiting example, a gyroscope. An interpretation by the processing unit 21 of data produced by such means, can make it possible for it to interrupt or start the implementation of processing or methods according to the invention implemented by said optical system 10, more specifically the steps of searching and/or recognizing possible relevant determined patterns, described later in line with the example of the method 100 illustrated by FIG. 3.

Finally, in a variant or complementarily, an optical system 10 according to the invention can advantageously have battery, or more generally any internal electrical energy source, in order to draw from it the electrical energy necessary for the functioning thereof.

Figure 3:
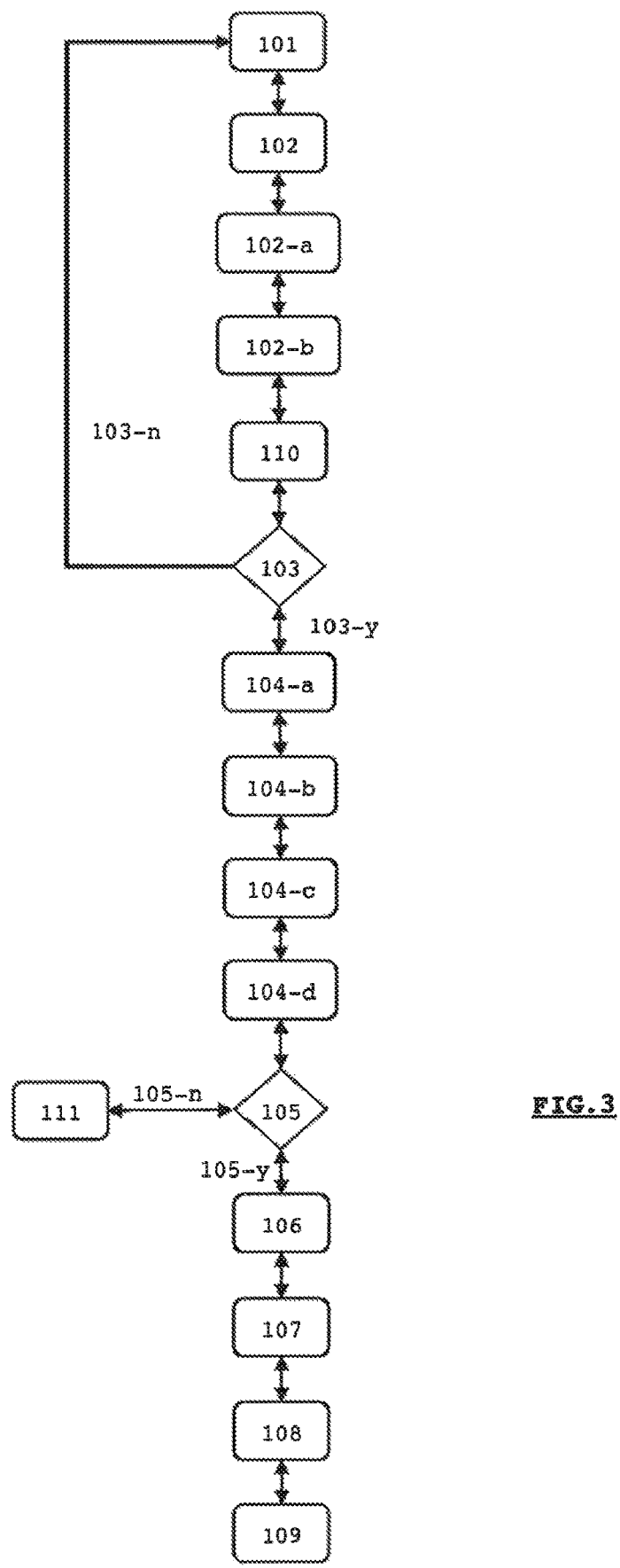
FIG. 3 describes a functional chart of a method for producing a digital image according to the invention.

FIG. 3 describes a functional diagram of a method 100 for producing a digital image according to the invention.

The method 100 can be implemented iteratively and continually, i.e. as non-limiting examples, every second or every other predetermined time periods. According to an advantageous, but non-limiting variant, said method 100 can be implemented iteratively, while the means 29 for detecting a movement of the hollow body 11 of an optical system 10 according to the invention returns a value characterizing a temporary immobility of the optical system, and/or can be interrupted when said means 29 for detecting a movement return a value conveying a movement of the optical system 10. As a non-limiting example, after a predetermined duration, even configurable, of immobility of the hollow body 11, for example ten seconds, the processing unit 21 can automatically trigger the implementation of the method 100 for producing a digital image.

To illustrate the contribution of the invention, a case will be studied, according to which an optical system 10 observes a study scene comprising a pattern composed of one or more astronomical objects O1, O2, such as a nebulous, for example.

In connection with FIG. 3, a method 100 according to the invention and implemented by the processing unit 21 of an optical system 10 such as described in connection with FIG. 1, comprises a first step 101 for triggering the capture of a study scene S, situated opposite the objective lens 12 and more generally of the optical system 10, for the capture means 24 of said optical system 10. Said step 101 consists, in particular, of producing a digital representation Rj of the study scene S. The data thus produced are stored in a recording ETRNj of a dedicated structure TRN within the storage means 23, for example in the form of a pixel table. As stated above, such a data structure TRN can comprise one or more recordings ETRNj, j being a whole number between 1 and m, m being a determined whole number, respectively associated with one or more digital representations Rj of a natural image captured.

The method 100 further comprises a step 103 for analyzing the content of a digital representation Rj produced, in order to detect the possible presence of a characteristic pattern, corresponding to a group of astronomical objects O1, O2 in the study scene S. Such a step 103 can consist of analyzing said digital representation Rj according to known methods, for example, by making a thresholding of said digital representation Rj. Such a thresholding can, as an example, consist of replacing the value of a gray level, a light intensity or a color associated with any pixel by a zero value, if said value is less than a predetermined threshold value, or by a second predetermined value of gray level, of light intensity or of color in the opposite case. As a non-limiting example, for a image made of two hundred and fifty-six gray levels, the predetermined threshold value can be fixed to one hundred and twenty-five. The detection of a characteristic pattern consists now of observing if the digital representation Rj after thresholding comprises pixels having a non-zero value, characterizing an object of high luminosity. Another thresholding technique can consist of calculating a histogram of the image, i.e. of determining a distribution of light intensities of pixels of the image. The detection of a characteristic pattern can thus consist of observing peaks on said histogram characterizing an object of high luminosity.

According to an advantageous, but non-limiting embodiment of the invention, a digital representation Rj must advantageously contain a predetermined and minimum number of astronomical objects to be effectively operated. For example, it has been able to be observed, that the value of such a predetermined and minimum number can advantageously be defined equal to four. Thus, the step 103 can furthermore consist of determining if the study scene S comprises enough astronomical objects to be operated. Such a determination can consist, from a thresholding of the digital representation Rj, of recording the zones of said representation of which the pixel value of non-zero or also the histogram peaks characterizing the presence of such objects. If said number of objects recorded is less than the value of said predetermined number, thus the implementation of the method 100 consists of triggering a new capture of the light beams RE from the scene S observed to obtain a new digital representation Rj, situation symbolized by the link 103-n in FIG. 3, by adjusting beforehand one or more capture parameters of the capture means 24, for example, to increase the application time or the duration of exposure, in order to capture more light beams RE. Such parameters can form the subject of a recording in a field of the data structure of parameters PRM mentioned above.

When a characteristic pattern is detected in the digital representation Rj, said method 100 comprises, moreover, a step 105 for searching, in the storage means 23, a recording Ei associated with a pattern Mi, similar or resembling said detected characteristic pattern. According to an advantageous embodiment example, said step 105 can now consist of generating, from the digital representation Rj, a polyvector, as a non-limiting example, a quadrivector, i.e. a vector with four dimensions with four coordinates outlining four astronomical objects. Such a vector is characterized by a couple of coordinates of the center of the field thereof making it possible to situate it in the ceiling structure. As a non-limiting example, such coordinates can be expressed in the form of a couple of values characterizing the declination and the right ascension of the center of the field. A quadrivector can furthermore be defined by characteristic values, such as the origin of a reference point defined from two of the four astronomical objects of the pattern and of which the origin is the center of the field and the coordinates of the two other astronomical objects in said reference point. Thus, such characteristic values can be determined by the relative position of four astronomical objects constituting the characteristic pattern. In this manner, the proportions, the orientation and the localization of the characteristic pattern can be determined. The step 105 can consist of searching in a structure TM, dedicated to the determined patterns Mi and recorded in the storage means 23, an associated recording Ei, i.e. comprising, for example, a field outlining characteristic data Mi for example, in the form of a quadrivector similar to those of the quadrivector of the characteristic pattern identified within the digital representation Rj.

If so, i.e. when the step 105 for searching for a recording associated with the detected characteristic pattern certifies the presence of such a recording Ei comprising characteristic data Mi similar to those of the characteristic pattern identified within the digital representation Rj, situation symbolized by the link 105-y in FIG. 3, the method 100 also comprises a step 106 for extracting from such a recording Ei, the identifiers IdO1 of the astronomical objects which compose it, and search in the structure TO dedicated to the astronomical objects for the recordings EO1 comprising said identifiers IdO1. The step 106 consists now of extracting said recordings EO1 of the metainformation IO1 associated respectively with the objects, for example the names thereof and the distances thereof with respect to the Earth. The combining or uniting of said metainformation constitutes an item of metainformation Ii associated with the pattern Mi. According to an embodiment variant, a recording Ei of a structure TM of patterns can directly comprise a field associated with the value of an item of metainformation Ii characterizing said pattern Mi. The latter item of metainformation can therefore be directly extracted in step 106.

A method 100 according to the invention further comprises a step 107 for producing a digital image RRk of which the objective lens is to be restored by the restoration means 25 of an optical system 10 according to the invention and describes, as a non-limiting example, by FIG. 1. Said step 107 can consist of producing said image RRk, such that the respective values of the pixels which compose it are equivalent to those of the values of the representation Rj, except for some pixels resulting from an inlay or an insertion in the digital representation Rj, of signs, of characters or of drawings, from metainformation IO1 and/or Ii extracted in 106. Such a step 107 can, as a non-limiting example, consist of inlaying a text zone according to known inlay methods. Complementarily, the digital image RRk thus produced can contain any type of geometrical symbols, such as circles or arrows, making it possible to highlight some astronomical objects.

Once the digital image RRk is produced in 107, the method 100 comprises a step 108 for triggering a graphical restoration of said digital image RRk by said restoration means 25 of an optical system 10 according to the invention. As explained above in connection with FIGS. 1 and 2, the light beams RP2 from the projection of said digital image RRk are combined with the light beams RE1 from the observation of the study scene S under the action of the semi-reflective plate 14. This combination is then observable, via the eyepiece 13, by a user of the optical system 10. Such a user thus benefits from additional information enriching the natural image, the product of their observation.

In a variant or complementarily, a method 100 according to the invention can comprise a step 109 for recording, from step 108, to restore by the restoration means 25, the digital image RRk in a recording ETRRk of the structure TRR stated above, dedicated to the restorable digital images within the storage means 23 of the optical system 10, for history purposes, for example.

The image which is observable via the eyepiece 13 is already of an excellent quality and corresponds at every point to what the user can perceive during their observation if the method 100 was not implemented, except for additional inlaid elements.

However, to further improve the vision of the user, a method 100 according to the invention can comprise an optical step 110, prior to the step 103 for analyzing the digital representation Rj, for extracting from the structure TRR dedicated to the restorable images, the digital image RRk produced during the preceding iteration of the implementation of the method 100 and to subtract, pixel by pixel, said image extracted from the digital representation Rj of the current study scene S. Indeed, given the configuration of an optical system 10 according to the invention, said digital representation Rj is the product of light beams RE2 (scene observed) and RP1 (digital image projected). This technique thus makes it possible to filter or reduce the contribution of said beams RP1 in the final production of the digital representation Rj analyzed in step 103.

The step 105 testing the similarity of a characteristic pattern detected within a digital representation Rj can be time-consuming if the structure TM associated with the determined patterns Mi comprises numerous recordings Ei. Indeed, a similarity test can be initially be totally useless if the characteristic pattern detected in an observation scene is located very distant spatially in the ceiling structure of a determined pattern Mi associated with a recording Ei of said structure TM. To reduce the number of similarity tests implemented in step 105, the method 100 can comprise, prior to said step 105, a step 104-a to collect the value of the localization data DL produced from data delivered by means 26, 27, 28a to determine the localization of the study scene S of an optical system 10 according to the invention. Said step 104-a can consist of requiring, after said localization means 26, the land positioning of said optical system 10, as a non-limiting example, by producing and encoding a localization request towards a geolocalization system, such as a non-limiting example, a GPS. The step 104-a therefore consists of receiving data, for example in the form of one or more values conveying a longitude, a latitude and/or an altitude of said optical system 10. Said data thus decoded can now be recorded in the storage means 23. The step 104-a furthermore consists of collecting data produced by the means 27 for determining the orientation of the objective lens 12. As an example, said step 104-a can consist of collecting the value of an angle between the magnetic north and a longitudinal axis AL of the optical system 10, in order to determine the orientation of said optical system 10. Said angle can be estimated by the processing unit 21 of the optical system 10 or directly by the means 27, when these comprise a magnetometer for example, then be communicated to said processing unit 21.

The method 100 can now comprise a step 104-b for assessing the localization of said study scene S in the ceiling structure from the localization data DL collected before. Knowing the land localization of the system 10 and the orientation of the objective lens 12 of the latter, the processing unit 21 can determine, by the implementation of known techniques, the portion of the ceiling structure observed and thus estimate positioning data DP of said study scene S.

To determine if a determined pattern Mi associated with a recording Ei of the structure TM is spatially distant from the study scene S, the method 100 can comprise a first step 104-c for extracting from said recording Ei associated with a pattern Mi, an item of localization data DLi and calculate a Euclidean distance between the field center of the detected characteristic pattern and the theoretical localization of the pattern Mi deduced from the data DLi. Said method 100 can further comprise a step 104-d to certify the proximity of a characteristic pattern determined from the determined pattern Mi from the structure TM, if said Euclidean distance is less than or equal to a predetermined distance dist_max characterizing a proximity zone around any astronomical object. If so, the pattern Mi is relevant for carrying out a similarity test, the step 105 can thus be implemented. If not, i.e. if said Euclidean distance is greater than said predetermined distance dist_max, such a test would not be relevant. The steps 104-c and 104-d are thus iterated with a separate recording from the structure TM.

To improve the quality of the restored digital image RRk, the invention provides for an optional step 102, prior to step 103 for analyzing the digital representation Rj. The object of such a step 102 ultimately consists of improving the resolution of said digital representation Rj. Indeed, during such a capture, the acquisition parameters of the capture means 24 can require being adjusted according to the properties of the sky at the time of the observation, to consider, for example, a possible light pollution, as regards the environment, in particular. In addition, an optical system 10 according to the invention, comprising lenses, can cause distortions or aberrations on the produced digital image RRk. The invention provides for the step 102 can now consist of implementing known methods and/or techniques for image correcting, such as non-limiting examples, a deconvolution of the point spread function, even a minimization of the blurring. In addition, to deliver a yield which is more attractive to the user, step 102 can furthermore consist of improving contrasts of the digital image produced RRk, in order to restore, through the restoration means 25, a more contrasted image.

It is also possible to reduce the noise and/or to improve the intensity and the contrast of the digital representation Rj analyzed in 103, by the implementation of an optional step 102-a triggering the capture of several successive digital images by the capture means 24, according to different acquisition parameters. The different intermediate digital representations produced Rj can be recorded in the storage means 23, for example in a data structure TRN provided for this purpose. A final representation Rj can thus be produced to be analyzed in 103, by the implementation of a step 102-b to create said final digital representation from said successive captures, for example, by averaging the gray level of light intensity value or color of each pixel from said successive captures. The Earth rotating on itself, without interruption, during the observation of astronomical objects, these appear to move until exiting the field of vision of the optical system 10. The step 102-b can now consist of re-tracking the intermediate digital representations Rj before averaging the pixels of each of them by the implementation of any known re-tracking methods. By "re-tracking method", this means any method making it possible to superpose the pixels from two different digital representations encoding one same mobile object observed at different times.

In a variant or complementarily, according to another variant of the invention, when step 105 for searching for, in the storage means or the data memory 23, a recording Ei associated with the characteristic pattern detected in a digital representation Rj does not succeed, a situation symbolized by the link 105-n in FIG. 3, the method 100 can implement a step 111 for producing a discovery message MsgD sent to a third-party entity 10T, ST through communication means 28b. Said message MsgD can comprise positioning data DP of the study scene S determined beforehand. Such a third-party entity can consist of a remote server ST for example or a second optical system 10T. It is thus possible to enrich the list of determined patterns Mi made available to a community of astronomers and ultimately recorded in the storage means 23 of the systems 10 according to the invention, for example in the form of structures TM. Indeed, upon receiving such a discovery message MsgD, said third-party entity 10T, ST searches for characteristic data of a pattern sharing localization data substantially similar to the positioning data DP contained in the discovery message. Said third-arty entity 10T, ST produces and emits, sent to the requesting optical system 10, a transmission message MsgT encoding data similar to those contained in a recording Ei outlining such a pattern sharing the localization data substantially similar to the positioning data DP. The step 111 thus consists of decoding such a transmission message MsgT and to create, from data from said transmission message MsgT, a new recording Ei in the structure TM. This is found collaboratively enriched.

Said third-party entity could be an optical system 10T according to the invention, the invention provides that the method 100 can comprise additional steps respectively aiming to receive a discovery message MsgD and to produce and emit a transmission message MsgT. Such additional steps would consist, as non-limiting examples, of:

decoding a discovery message MsgD, said discovery message MsgD comprising positioning data DP of a study scene S in the ceiling structure;

searching in the data memory for characteristic data of a pattern determined by said positioning data DP of the study scene S deduced from said discovery message MsgD and characteristic data of a determined pattern, localization data DLi and an item of metainformation associated to said pattern;

producing a transmission message MsgT to encode said characteristic data of a determined pattern, said localization data DLi and said item of metainformation associated with said pattern;

triggering the emission of said transmission message MsgT by said communication means 28b.

Such searching, producing and triggering of a transmission message MsgT can furthermore ensue from the receiving, by the communication means 28b, of a separate information request, for example a request for observation of a portion of the ceiling structure coming from a third-party entity 10T, ST, instead of a response to the receiving of a discovery message MsgD. The processing unit 21 can thus be arranged to implement a step, prior to the production of a transmission message MsgT, to proceed with the capture of a study scene S of which the positioning data DP in the ceiling structure are deduced from such an observation request. Said transmission message MsgT can in this case, furthermore encode the digital representation Rj or the digital image RRk, the product of said capture. Finally, the invention provides that such a capture of a study scene S of which the positioning data DP in the ceiling structure are deduced from an observation request can be implemented without necessarily being followed by a step for producing a transmission message, with the aim of controlling an optical system comprising automatic aiming means, one or more motors and/or actuators, and/or offering a user a simplified procedure and assisted by an observation of a portion determined by positioning data in the ceiling structure such that, in a non-limiting manner, an assistance with the aiming of a given study scene.

The invention also provides that the discovery message MsgD, transmission message MsgT and other information requests can further comprise or encode any other complementary information, such as non-limiting examples, parameter values relative to a capture of a portion of the ceiling structure, for example an application time or a sensitivity to the light of the capture means, an acquired digital representation or a produced image.

Moreover, according to a variant of the invention, a digital image RRk produced in 105 can comprise a graphic content making it possible to indicate, to the user of a system 10 according to the invention of which a processing unit 21 implements a method 100 such as defined beforehand, that an astronomical object of interest is located in the proximity of the study scene S currently observed. Said graphic content, for example an oriented arrow, can be stored in the storage means 23 and be restored, accompanied by a text content indicating the direction of the positioning of said astronomical object being located in the proximity of the studied scene S. The user can thus, if they so desire, orient their optical system to observe a new scene comprising said object. Such an indication can be encoded in the form of an item of metainformation Ii associated with a pattern Mi determined in the structure TM or with an astronomical object comprising a memory structure TO such as described above.

The invention has been described during the use thereof in line with applications relative to the observation of a study scene corresponding to a portion of the ceiling structure by an optical system, such as, in a non-limiting manner, a telescope or an astronomical telescope. In the sense of the invention and in the whole document, the notions of "localization and/or positioning data" can further comprise spatial or geographical coordinates, a time stamping of a capture of a portion of the ceiling structure, for example of a study scene S, of which come said localization and/or positioning data. In this case, the processing unit 21 of an optical system 10 will comprise or cooperate with the time stamping means, such as, in a non-limiting manner, an atomic clock, such a clock possibly cooperating with a smartphone and/or a satellite navigation and localization system, etc., and the data structures within the data memory 23 will be arranged to record such composite localization and/or positioning data.

The method for producing a digital image according to the invention has been described during the implementation thereof by an optical system such as presented in line with FIGS. 1 and 2. The invention also provides that such a method can be implemented by an optical system having a different structure, for example comprising a reflective plate instead of the semi-reflective plate, or also any other different optical arrangement including (or not) said semi-reflective plate. For example, the capture means 24 and the restoration means 25 of an optical system 10 according to the invention could be positioned along a longitudinal axis of the hollow body, the active faces of the latter being opposite one another.

Other modifications can be considered without exiting the scope of the present invention defined by the appended claims.

The invention claimed is:

1. An optical system, comprising,
a processing unit, a non-transitory computer-readable medium and a program memory coupled to the processing unit and having program instructions stored thereon which, when executed by the processing unit, cause the processing unit to produce a digital image;

a hollow body, comprising,
  an objective lens to collect a set of incoming light beams from a study scene corresponding to a portion of a ceiling structure;
  a matrix sensor cooperating with the processing unit and having an active face, to capture all or some of said incoming light beams, said matrix sensor producing a digital representation of the study scene,
a data memory for recording information associated with a determined pattern comprising an item of metainformation characterizing said pattern; and
wherein the processing unit is arranged to produce the digital image from an electronic transformation of the digital representation, and
the processing unit further cooperates with the program memory comprising program instructions which, when executed by the processing unit,
analyze said digital representation and detect the presence of a characteristic pattern;
search in the data memory for a recording associated with a determined pattern close to said detected characteristic pattern;
extract the value of the associated metainformation from such a recording; and
trigger the acquisition of several successive digital representations by the matrix sensor;
produce one single digital representation from said successive digital representations,
and
wherein the processing unit cooperates with a program memory comprising program instructions, which, when executed by the processing unit, reduce noise and/or improve intensity and contrast of the digital representation in order to improve quality of the digital image.

2. The optical system according to claim 1, comprising:
an eyepiece;
a screen cooperating with the processing unit and comprising an active face to project, into the hollow body, to the eyepiece, the digital image in the form of a set of projected light beams;
a semi-reflective plate positioned within the hollow body to reflect a first subset of incoming light beams towards the active face of said matrix sensor and transmit a second subset of incoming light beams towards the eyepiece, the semi-reflective plate being furthermore arranged to transmit and reflect the first and second subsets of said projected light beams respectively towards the active face of the matrix sensor and the eyepiece;
wherein the respective active faces of the matrix sensor and the screen face one another and are arranged on either side of the semi-reflective plate, said active faces being passed through by a virtual transversal axis of the hollow body perpendicular to a virtual longitudinal axis of said hollow body and passing through a center of the semi-reflective plate.

3. The optical system according to claim 2, wherein the hollow body comprises a polarizer to absorb the light beams projected and transmitted by the semi-reflective plate, arranged between the matrix sensor and the screen, said polarizer being passed through by the virtual transversal axis.

4. The optical system according to claim 2, wherein the hollow body comprises an imaging lens to constitute an image from projected light beams, arranged between the screen and the semi-reflective plate, said lens being passed through by the virtual transversal axis.

5. The optical system according to claim 1, further comprising communication means cooperating with the processing unit, arranged to receive a transmission message emitted from a third-party entity, the processing unit being arranged to:
decode such a transmission message emitted by said third-party entity, said transmission message encoding characteristic data of a determined pattern, localization data and an item of metainformation associated with said pattern; and
record in the data memory, said characteristic data of a determined pattern, said localization data and said metainformation associated with said pattern and deduced from said transmission message;
wherein the communication means is a modulator/demodulator.

6. The optical system according to claim 5, wherein the communication means are arranged to emit a discovery message and the processing unit is furthermore arranged to:
produce said discovery message, such that it encodes the positioning data of the study scene in the ceiling structure; and
trigger the emission of said discovery message by the communication means to request from a third-party entity of the characteristic data of a pattern determined by said positioning data of the study scene and an item of metainformation in line with said determined pattern.

7. The optical system according to claim 1, further comprising communication means cooperating with the processing unit and arranged to emit a transmission message, the processing unit being arranged to:
search in a data memory for characteristic data of a pattern determined by positioning data of the study scene and characteristic data of a determined pattern, localization data and an item of metainformation associated with said pattern;
produce a transmission message to encode said characteristic data of a determined pattern, said localization data and said item of metainformation associated with said pattern; and
trigger the emission of said transmission message by said communication means;
wherein the communication means is a modulator/demodulator.

8. The optical system according to claim 1, further comprising communication means cooperating with the processing unit and arranged to emit a transmission message and receive a discovery message, the processing unit being arranged to:
decode said discovery message, said discovery message comprising positioning data of a study scene in the ceiling structure;
search in a data memory for characteristic data of a pattern determined by said positioning data of the study scene deduced from said discovery message and characteristic data of a determined pattern, localization data and an item of metainformation associated with said pattern;
produce a transmission message to encode said characteristic data of a determined pattern, said localization data and said item of metainformation associated with said pattern; and
trigger the emission of said transmission message by said communication means;
wherein the communication means is a modulator/demodulator.

9. A method for producing a digital image implemented by the processing unit of an optical system according to claim 1 and observing a study scene, said processing unit cooperating with the matrix sensor, and a data memory of said optical system, said method comprising:
- a step for recording, in the data memory, information associated with a determined pattern comprising an item of metainformation characterizing said pattern;
- a step for triggering the capture of incoming light beams from said study scene by the matrix sensor and producing a digital representation of said study scene;
- a step for analyzing said digital representation and detecting the presence of a characteristic pattern;
- a step for searching in the data memory for a recording associated with a determined pattern close to said detected characteristic pattern;
- a step for extracting the value of the associated metainformation from such a recording;
- a step for producing a digital image from the digital representation and from said extracted metainformation, and
- wherein prior to the step for analyzing said digital representation produced by the matrix sensor, a step for improving the contrast and/or reducing noise of the digital representation.

10. The method according to claim 9, further comprising:
a step for the associating in the data memory the recording with a localization data of the determined pattern in the ceiling structure;
wherein the method further comprises, prior to the step of searching in the data memory for a recording associated with a pattern close to the detected characteristic pattern:
- a step for determining the positioning data of the study scene in the ceiling structure;
- a step for extracting from a first recording of the data memory, localization data and calculating a distance between said localization data extracted and the positioning data of said study scene in the ceiling structure; and
- a step for certifying the proximity of a pattern associated with the localization data extracted if said calculated distance is less than a predetermined threshold;
wherein said step for searching in the data memory for a recording associated with a pattern close to the detected characteristic pattern is implemented if and only if the step for certifying the proximity of the pattern associated with the localization data extracted from the study scene certifies such a proximity.

11. The method according to claim 9, comprising, prior to the step for analyzing said digital representation:
- a step for triggering the acquisition of several successive digital representations by the matrix sensor; and
- a step for producing one single digital representation from said successive digital representations.

12. The method according to claim 9, comprising:
a step for recording said digital image in the data memory; and
a step, prior to the step for analyzing the digital representation, for extracting from said data memory the digital image from the preceding restoration and subtracting said digital image from the digital representation of the current study scene.

13. The method according to claim 9, comprising:
a step for establishing communication between the processing unit and a third-party entity;
wherein said method comprises a step for producing a discovery message comprising the positioning data of the study scene in the ceiling structure and triggering the emission of said discovery message, if the step for searching in the data memory for a recording associated with a pattern close to the characteristic pattern has not succeeded.

14. The method according to claim 9, wherein the step for triggering the capture of incoming light beams from said study scene by the matrix sensor and producing a digital representation of said study scene is implemented so as to capture a study scene named by positioning data of said study scene in the ceiling structure.

15. The optical system according to claim 9, wherein the program memory comprises program instructions which when there are executed by the processing unit, average the gray level of light intensity value or color of each pixel from said successive digital representations.

16. The optical system according to claim 9, wherein the processing unit is arranged to produce the digital image from an electronic transformation of the digital representation and an item of metainformation recorded in a data memory cooperating with said processing unit.

* * * * *